United States Patent
Han

(10) Patent No.: US 11,853,135 B2
(45) Date of Patent: Dec. 26, 2023

(54) HEAT DISSIPATION CONTROL METHOD, APPARATUS AND DEVICE

(71) Applicant: INSPUR SUZHOU INTELLIGENT TECHNOLOGY CO., LTD., Jiangsu (CN)

(72) Inventor: Hongrui Han, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 44 days.

(21) Appl. No.: 18/023,398

(22) PCT Filed: Jun. 30, 2021

(86) PCT No.: PCT/CN2021/103361
§ 371 (c)(1),
(2) Date: Feb. 27, 2023

(87) PCT Pub. No.: WO2022/052583
PCT Pub. Date: Mar. 17, 2022

(65) Prior Publication Data
US 2023/0229209 A1    Jul. 20, 2023

(30) Foreign Application Priority Data
Sep. 8, 2020 (CN) .......................... 202010935962.1

(51) Int. Cl.
*G06F 1/20* (2006.01)
*G05B 19/4155* (2006.01)

(52) U.S. Cl.
CPC ........... *G06F 1/20* (2013.01); *G05B 19/4155* (2013.01); *G05B 2219/49216* (2013.01)

(58) Field of Classification Search
CPC ...................................................... G06F 1/20
See application file for complete search history.

(56) References Cited

U.S. PATENT DOCUMENTS

| 2006/0133032 A1* | 6/2006 | Uchida | .................. G06F 1/203 361/679.48 |
| 2007/0252544 A1 | 11/2007 | Chotoku et al. | |
| 2012/0265363 A1 | 10/2012 | Hung et al. | |

FOREIGN PATENT DOCUMENTS

| CN | 1758171 A | 4/2006 |
| CN | 103228122 A | 7/2013 |

(Continued)

OTHER PUBLICATIONS

Corresponding International Patent Application No. PCT/CN2021/103361, International Search Report, dated Sep. 13, 2021.

(Continued)

*Primary Examiner* — Mark A Connolly
(74) *Attorney, Agent, or Firm* — COOPER LEGAL GROUP, LLC

(57) ABSTRACT

A heat dissipation control method is disclosed, wherein the heat generation speed of a heat dissipation channel may be calculated according to a power consumption value of each component in the heat dissipation channel, and a radiator is then controlled on the basis of the heat generation speed, whereby the heat dissipation speed of the heat dissipation channel is comparable to the heat generation speed. A heat dissipation control apparatus and device are further disclosed, which have the same beneficial effects as the heat dissipation control method.

20 Claims, 1 Drawing Sheet

(56) References Cited

FOREIGN PATENT DOCUMENTS

| | | | |
|---|---|---|---|
| CN | 104460911 A | | 3/2015 |
| CN | 105116009 A | * | 12/2015 |
| CN | 106292963 A | | 1/2017 |
| CN | 108089682 A | * | 5/2018 |
| CN | 208805774 U | | 4/2019 |
| CN | 111506130 A | | 8/2020 |
| CN | 112105225 A | | 12/2020 |
| TW | 542328 U | | 5/2017 |
| WO | WO-2018054051 A1 | * | 3/2018 ............... G06F 1/20 |
| WO | WO-2022264530 A1 | * | 12/2022 |

OTHER PUBLICATIONS

Corresponding International Patent Application No. PCT/CN2021/103361, Written Opinion, dated Sep. 3, 2021.
Corresponding Chinese Patent Application No. 202010935962.1, First Office Action dated Aug. 25, 2021.
Corresponding Chinese Patent Application No. 202010935962.1, Notification to Grant Patent dated Mar. 21, 2022.
Borrnert, Thomas, et al., "Waste Heat Conversion Into Electricity", ABB Switzerland Ltd., Local Business Unit Minerals & Printing, 52nd Cement Industry Technical Conference, May 20, 2010, pp. 1-8.
Zhao, Yanchen, et al., "Wind resistance experiment and cooling fan design of aeronautic generators", China Mechanical Engineering, Oct. 25, 2019, pp. 2505-2511, vol. 30, No. 20.

* cited by examiner ial safety hazard of related component and prolonging the
HEAT DISSIPATION CONTROL METHOD, APPARATUS AND DEVICE This application claims priority to Chinese Patent Application No. 202010935962.1, filed on Sep. 8, 2020 in China National Intellectual Property Administration and entitled "Heat Dissipation Control Method, Apparatus and Device", which is hereby incorporated by reference in its entirety.

FIELD

The present disclosure relates to the field of servers, in particular to a heat dissipation control method, a heat dissipation control apparatus, and a heat dissipation control device.

BACKGROUND

In a server, an existing heat dissipation control method usually detects a current temperature at a target position, and controls a fan to operate at a rotating speed corresponding to the current temperature, so as to provide a corresponding heat dissipation capability. By means of the existing heat dissipation control method, corresponding heat dissipation is provided after the actual temperature value reaches a certain value, so the heat dissipation lags behind, that is, when heat is dissipated, the temperature value of the target position (for example, CPU (Central Processing Unit) is already at a relatively high level). In addition, the heat dissipation takes certain time. Therefore, a device at the target position will work for a long time at the relatively high temperature value, which makes the related device have a potential safety hazard and may shorten the service life of the device.

Therefore, how to provide a solution for solving the above technical problems is a problem that those skilled in the art need to solve at present.

SUMMARY

An objective of the present disclosure is to provide a heat dissipation control method, whereby respective component in a heat dissipation channel works as little as possible under a high-temperature condition, thereby eliminating a potential safety hazard of related component and prolonging the service life of the component. Another objective of the present disclosure is to provide a heat dissipation control apparatus and device, whereby respective component in a heat dissipation channel works as little as possible under a high-temperature condition, thereby eliminating a potential safety hazard of related component and prolonging the service life of the component.

In order to solve the above technical problems, the present disclosure provides a heat dissipation control method, including:
  calculating heat generation speed of a heat dissipation channel according to a power consumption value of each component in the heat dissipation channel;
  calculating heat dissipation speed of the heat dissipation channel according to a temperature value of the heat dissipation channel and an actual flow rate of a heat dissipation medium per unit time;
  determining a first parameter adjustment amount for a heat sink according to a difference between the heat generation speed and the heat dissipation speed; and
  controlling the heat sink according to the first parameter adjustment amount, whereby the heat dissipation speed is comparable to the heat generation speed.

The step of calculating the heat generation speed of the heat dissipation channel according to the power consumption value of each component in the heat dissipation channel comprises:
  obtaining the power consumption value of each inactive component in the heat dissipation channel; and
  calculating the heat generation speed of the heat dissipation channel according to a sum of the power consumption values.

The step of calculating the heat dissipation speed of the heat dissipation channel according to the temperature value of the heat dissipation channel and the actual flow rate of the heat dissipation medium per unit time comprises:

$$V_{heat\ dissipation} = C \times CFM \times \rho \times \Delta T;$$

$$CFM = V \times S;$$

where $V_{heat\ dissipation}$ is the heat dissipation speed, C is a specific heat capacity of air, CFM is the actual flow rate of the heat dissipation medium per unit time in the heat dissipation channel, $\rho$ is a density of the heat dissipation medium, $\Delta T$ is a temperature difference between an inlet temperature and an outlet temperature of the heat dissipation medium in the heat dissipation channel, V is a flow rate of the heat dissipation medium, and S is a cross-sectional area of the heat dissipation channel.

A plurality of heat dissipation channels are provided;
The step of obtaining the power consumption value of each inactive component in the heat dissipation channel comprises:
  obtaining the power consumption value of each inactive component in a target heat dissipation channel;
The step of calculating the heat generation speed of the heat dissipation channel according to the sum of the power consumption value comprises:
  calculating the heat generation speed of the target heat dissipation channel according to the sum of the power consumption values.

The heat sink is a fan;
The heat dissipation channel is an air channel and the heat dissipation medium is air.
The method is applied to a processor independent of a server where the heat sink is located.
A plurality of heat sinks correspond to the heat dissipation channel; The step of controlling the heat sink according to the first parameter adjustment amount comprises:
  controlling the plurality of heat sinks corresponding to the heat dissipation channel according to the first parameter adjustment amount, with a highest sum of energy conversion efficiencies of the plurality of heat sinks corresponding to the heat dissipation channel as a goal.
After the step of controlling the heat sink according to the first parameter adjustment amount, the heat dissipation control method further includes:
  calculating a flow rate compensation value of the actual flow rate relative to a current theoretical flow rate in the heat sink per unit time;
  generating a second parameter adjustment amount for the heat sink according to the flow rate compensation value per unit time; and
  controlling the heat sink according to the second parameter adjustment amount, whereby the actual flow rate per unit time is equal to the theoretical flow rate per unit time.

In order to solve the above technical problems, the present disclosure further provides a heat dissipation control apparatus, including:

a first calculation module, configured to calculate the heat generation speed of a heat dissipation channel according to a power consumption value of each device in the heat dissipation channel;

a second calculation module, configured to calculate the heat dissipation speed of the heat dissipation channel according to a temperature value of the heat dissipation channel and an actual flow rate of a heat dissipation medium per unit time;

a determination module, configured to determine a first parameter adjustment amount for a heat sink according to the difference between the heat generation speed and the heat dissipation speed; and a control module, configured to control the heat sink according to the first parameter adjustment amount, whereby the heat dissipation speed matches the heat generation speed.

In order to solve the above technical problems, the present disclosure further provides a heat dissipation control device, including:

a memory, configured to store a computer program; and a processor, configured to implement any steps of the heat dissipation control method as described above when executing the computer program.

The present disclosure provides a heat dissipation control method. By means of the present application, the heat generation speed of a heat dissipation channel may be calculated according to a power consumption value of respective component in the heat dissipation channel, and a heat sink is then controlled on the basis of the heat generation speed, whereby the heat dissipation speed of the heat dissipation channel is comparable to the heat generation speed. Before an actual temperature rises, there is usually a period of time during which power consumption is relatively high, i.e., during which the temperature rises, and therefore, by means of the present application, the heat dissipation speed can be matched within the period of time, so as to suppress the temperature rise of respective component in the heat dissipation channel, whereby respective component in the heat dissipation channel works as little as possible under a high-temperature condition, thereby eliminating a potential safety hazard of related component and prolonging the service life of the component.

The present disclosure further provides a heat dissipation control apparatus and device, which have the same beneficial effects as the heat dissipation control method.

BRIEF DESCRIPTION OF THE DRAWINGS

In order to describe the technical solutions in the embodiments of the present disclosure more clearly, drawings required to be used in the prior art and the embodiments will be briefly introduced below. Apparently, the drawings in the description below are only some embodiments of the present disclosure. Those of ordinary skill in the art also can obtain other drawings according to the provided drawings without creative work.

DETAILED DESCRIPTION

The core of the present disclosure is to provide a heat dissipation control method, whereby respective component in a heat dissipation channel works as little as possible under a high-temperature condition, thereby eliminating a potential safety hazard of related component and prolonging the service life of the component. Another core of the present disclosure is to provide a heat dissipation control apparatus and device, whereby respective component in a heat dissipation channel works as little as possible under a high-temperature condition, thereby eliminating a potential safety hazard of related component and prolonging the service life of the component.

In order to make the objectives, technical solutions and advantages of the present disclosure clearer, the technical solutions in the embodiments of the present disclosure will be clearly and completely described with reference to the drawings in the embodiments of the present disclosure. Apparently, the embodiments described are only some of, not all of the embodiments of the present disclosure. All other embodiments obtained by those of ordinary skill in the art based on the embodiments of the present disclosure without any creative efforts shall fall within the protection scope of the present disclosure.

Figure 1:
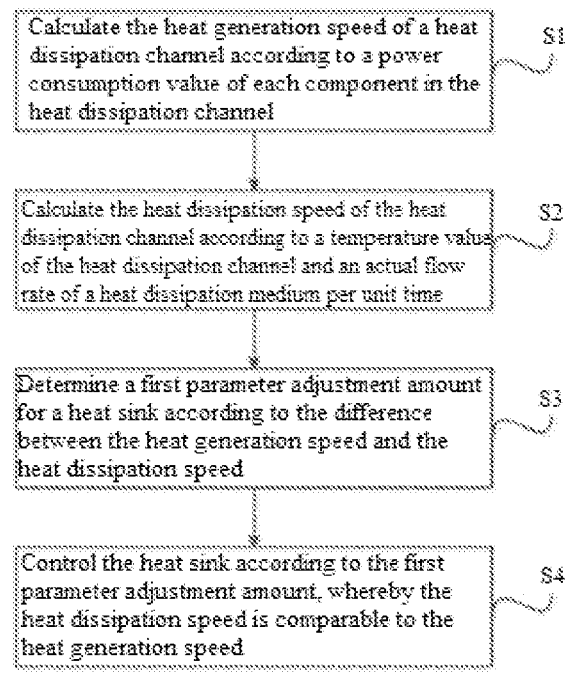
FIG. 1 is a schematic flowchart of a heat dissipation control method provided by the present disclosure.

Refer to FIG. 1. FIG. 1 is a schematic flowchart of a heat dissipation control method provided by the present disclosure. The heat dissipation control method includes:

Step S1: the heat generation speed of a heat dissipation channel is calculated according to a power consumption value of respective component in the heat dissipation channel;

Considering the technical problems in the Background above, and at the same time, considering, by the applicant, that the temperature rise, the process of which is not completed instantaneously, in the heat dissipation channel mainly comes from electro-thermal conversion when components are powered on, the heat generation speed corresponding to the power consumption value of respective component in the heat dissipation channel may be detected in a timely manner before temperature rise, and targeted treatment to prevent temperature rise can be carried out.

The heat dissipation channel may refer to a channel through which a heat dissipation medium in a heat sink flows, such as an air channel of a fan or a water flow channel of a liquid-cooled heat dissipation apparatus. This is not limited in the embodiment of the present disclosure.

Respective component may refer to a component capable of converting energy to generate heat, and may include, for example, a CPU, a GPU (Graphics Processing Unit), a wire, etc. This is not limited in the embodiment of the present disclosure.

Step S2: the heat dissipation speed of the heat dissipation channel is calculated according to a temperature value of the heat dissipation channel and an actual flow rate of a heat dissipation medium per unit time;

In order to control a heat sink to match the heat dissipation speed of the heat sink with the heat generation speed of the heat dissipation channel, the current heat dissipation speed of the heat dissipation channel under the action of the heat sink shall be known first, whereby the heat sink may be controlled on the basis of the current heat dissipation speed to achieve matching.

The temperature value of the heat dissipation channel may reflect the temperature change of the heat dissipation channel under the heat dissipation effect of the heat sink, and the actual flow rate of the heat dissipation medium per unit time is also directly related to the heat dissipation speed, so the heat dissipation speed of the heat dissipation channel may be accurately calculated according to the two data.

Of course, besides calculating the heat dissipation speed of the heat dissipation channel according to the above two data, the heat dissipation speed of the heat dissipation channel may also be calculated in other ways. This is not limited in the embodiment of the present disclosure.

Step S3: a first parameter adjustment amount for a heat sink is determined according to the difference between the heat generation speed and the heat dissipation speed;

The difference between the heat generation speed and the heat dissipation speed may be arbitrary, and the difference may also be zero. When the difference of subtracting the heat dissipation speed from the heat generation speed is positive, it indicates that the power consumption of respective component in the heat dissipation channel increases, and the heat generation capacity of heat sink in the heat dissipation channel increases, so the power consumption of the heat sink needs to be increased to make the heat dissipation speed match the heat generation speed, and the temperature of the components need to be suppressed before the temperature of respective component in the heat dissipation channel rises. When the difference of subtracting the heat dissipation speed from the heat generation speed is negative, it indicates that the power consumption of respective component in the heat dissipation channel decreases, and the heat generation capacity of respective component in the heat dissipation channel decreases, so the power consumption of the heat sink needs to be decreased to make the heat dissipation speed match the heat generation speed to eliminate energy waste.

When the difference between the heat generation speed and the heat dissipation speed is not zero, the heat sink needs to be controlled according to the difference. The control on the heat sink actually refers to adjustment on the operating power consumption of the heat sink. Therefore, the first parameter adjustment amount for the heat sink is determined according to the difference between the heat generation speed and the heat dissipation speed, so as to control the heat sink in subsequent steps based on the adjustment amount.

The parameter refers to a parameter related to the heat dissipation capacity provided by the heat sink, for example, when the heat sink is a fan, the parameter may refer to a rotating speed of the fan and the like. This is not limited in the embodiment of the present disclosure.

Step S4: the heat sink is controlled according to the first parameter adjustment amount, whereby the heat dissipation speed is comparable to the heat generation speed.

After the first parameter adjustment amount for the heat sink is determined, the heat sink may be controlled according to the first parameter adjustment amount, whereby the heat dissipation speed may be comparable to the heat generation speed, and the temperature of respective component in the heat dissipation channel is always kept in a stable and healthy range, which is beneficial to the stable operation of a server and reduces the probability of damage to a related component.

The heat dissipation control method in the embodiment of the present disclosure may be performed once every preset period of time, so as to continuously keep respective component in the heat dissipation channel operating in a healthy and stable temperature value range.

It is worth mentioning that temperature sensors may also be disposed on key components (such as CPU and GPU) in the present application to monitor and prompt their temperatures, raise over-temperature alarms, and the like, so as to ensure the safety of the key components at temperature control errors.

Under the condition of reducing high-temperature conditions of components, high-speed operation time of the fan is equivalently reduced, and system noise is also reduced, thereby improving user experience.

The present disclosure provides a heat dissipation control method. By means of the present application, the heat generation speed of a heat dissipation channel may be calculated according to a power consumption value of respective component in the heat dissipation channel, and a heat sink is then controlled on the basis of the heat generation speed, whereby the heat dissipation speed of the heat dissipation channel is comparable to the heat generation speed. Before an actual temperature rises, there is usually a period of time during which power consumption is relatively high, i.e., during which the temperature rises, and therefore, by means of the present application, the heat dissipation speed can be matched within the period of time, so as to suppress the temperature rise of respective component in the heat dissipation channel, whereby respective component in the heat dissipation channel works as little as possible under a high-temperature condition, thereby eliminating a potential safety hazard of related component and prolonging the service life of the component.

On the basis of the above embodiment:

The step that the heat generation speed of a heat dissipation channel is calculated according to a power consumption value of respective component in the heat dissipation channel comprises:

The power consumption value of each inactive component in the heat dissipation channel is obtained; and The heat generation speed of the heat dissipation channel is calculated according to a sum of the power consumption values.

Considering that most of the components in the heat dissipation channel convert energy into heat energy for temperature rise, there are also components that convert energy into kinetic energy, for example, the fan used for heat dissipation and the like, and the power consumption values of such active components shall not be referred to when the heat generation speed is generated. Therefore, in the embodiment of the present disclosure, the power consumption value of each inactive component in the heat dissipation channel may be first obtained, and then the heat generation speed of the heat dissipation channel is calculated based on the power consumption values of the inactive component.

The step that the heat generation speed of the heat dissipation channel is calculated according to a sum of the power consumption values may be:

The heat generation power consumption of respective component is calculated; and The sum of the heat generation power consumptions of the components is taken as the heat generation speed;

The heat generation power consumption of respective component may be calculated by multiplying voltage U by current I, and the heat generated by the component within a period of time T is $Q=U*I*T$.

The voltage may be a constant value, and the real-time value of the current may be collected by a current sensor. This is not limited in the embodiment of the present disclosure.

Of course, in addition to the above calculation method, the heat generation power consumption of respective component may also be calculated in other ways. This is not limited in the embodiment of the present disclosure.

In an embodiment, the step that the heat dissipation speed of the heat dissipation channel is calculated according to a temperature value of the heat dissipation channel and an actual flow rate of a heat dissipation medium per unit time is as follow:

$$V_{heat\ dissipation} = C \times CFM \times \rho \times \Delta T;$$

$$CFM = V \times S;$$

Where $V_{heat\ dissipation}$ is the heat dissipation speed, C is a specific heat capacity of air, CFM (Cubic Feet per Minute) is the actual flow rate of the heat dissipation medium per unit time in the heat dissipation channel, $\rho$ is a density of the heat dissipation medium, $\Delta T$ is a temperature difference between an inlet temperature and an outlet temperature of the heat dissipation medium in the heat dissipation channel, V is a flow rate of the heat dissipation medium, and S is a cross-sectional area of the heat dissipation channel.

The heat dissipation speed may be accurately calculated by the above formula.

Of course, in addition to the above formula, the heat dissipation speed may also be calculated by other types of formulas. This is not limited in the embodiment of the present disclosure.

The inlet temperature and the outlet temperature of the heat dissipation medium in the heat dissipation channel may be collected by temperature sensors, and the flow rate of the heat dissipation medium may be collected by a wind speed sensor (when the heat sink is a fan) or the like. This is not limited in the embodiment of the present disclosure.

In an embodiment, a plurality of heat dissipation channels are provided; The step that the power consumption value of each inactive component in the heat dissipation channel is obtained comprises:

The power consumption value of each inactive component in a target heat dissipation channel is obtained;

The step that the heat generation speed of the heat dissipation channel is calculated according to a sum of the power consumption values comprises:

The heat generation speed of the target heat dissipation channel is calculated according to the sum of the power consumption values.

When there are a plurality of heat dissipation channels in a server, the heat dissipation control method in the present application may control a heat sink(s) corresponding to each heat dissipation channel, that is, control a plurality of heat sinks in the server in a target manner without unified control as in the prior art, which can reduce the power consumption and ensure that the temperature value of each heat dissipation channel is stabilized in a healthy temperature value range.

In an embodiment, the heat sink is a fan; The heat dissipation channel is an air channel and the heat dissipation medium is air.

The fan is a common heat sink, which has advantages such as low cost and simple structure.

Of course, in addition to the fan, the heat sink may alternatively be of other types. This is not limited in the embodiment of the present disclosure.

In an embodiment, the method is applied to a processor independent of a server where the heat sink is located.

The processor independent of the server where the heat sink is located executes a program corresponding to the foregoing heat dissipation control method, which may alleviate the pressure of a BMC (Baseboard Management Controller), so as to run other services better.

The processor may be of various types, such as a monolithic device or an ARM (Advanced RISC (Reduced Instruction Set Computing) Machines, advanced reduced instruction set processor) processor. This is not limited in the embodiment of the present disclosure.

In an embodiment, a plurality of heat sinks correspond to the heat dissipation channel;

The step that the heat sink is controlled according to the first parameter adjustment amount comprises:

The plurality of heat sinks corresponding to the heat dissipation channel are controlled according to the first parameter adjustment amount, with a highest sum of energy conversion efficiencies of the plurality of heat sinks corresponding to the heat dissipation channel as a goal.

Because the heat sink operates at different power consumption, its energy conversion efficiency is greatly different. When the energy conversion efficiency is low, energy waste is equivalently caused. For example, when the heat sink is a fan, if the speed of the fan is too high, its energy conversion efficiency is poor. Therefore, in the embodiment of the present disclosure, when there are a plurality of heat sinks corresponding to the heat dissipation channel, the plurality of heat sinks corresponding to the heat dissipation channel may be controlled according to the first parameter adjustment amount, with the highest sum of energy conversion efficiencies of the plurality of heat sinks corresponding to the heat dissipation channel as a goal. For example, in a case, when there are three fans, if two of the fans operate at a wind speed corresponding to the highest energy conversion efficiency, the current heat dissipation demand may be met without work of the other fan, then the two fans may be controlled to operate at the wind speed corresponding to the highest energy conversion efficiency, and the other fan may not work, whereby the energy conversion efficiency of the heat sinks corresponding to the heat dissipation channel is the highest, which is equivalent to providing the required wind speed with the least electric energy and reducing energy consumption.

Of course, in addition to the example illustrated above, the plurality of heat sinks corresponding to the heat dissipation channel may also be controlled in other specific forms according to the first parameter adjustment amount, with the highest sum of energy conversion efficiency of the plurality of heat sinks corresponding to the heat dissipation channel as a goal. This is not limited in the embodiment of the present disclosure.

In an embodiment, after the heat sink is controlled according to the first parameter adjustment amount, the heat dissipation control method further includes:

A flow rate compensation value of the actual flow rate relative to a current theoretical flow rate of the heat sink per unit time is calculated;

A second parameter adjustment amount for the heat sink is generated according to the flow rate compensation value per unit time; and The heat sink is controlled according to the second parameter adjustment amount, whereby the actual flow rate per unit time is equal to the theoretical flow rate per unit time.

Considering that different structures of heat dissipation channels impose different resistance to a heat dissipation medium, the resistance also affects the heat dissipation speed. For example, the fan, which is intended to be controlled to work at 1000 revolutions per minute, works only at 800 revolutions per minute due to excessive resistance of the heat dissipation channel, and correspondingly, the actual flow rate per unit time is smaller than the theoretical flow rate per unit time 1000 revolutions/min, so the heat dissipation speed at this time is reduced relative to the ideal heat dissipation speed. If this condition is not discovered in time, the temperature in the heat dissipation channel inevitably rises, the probability of thermal failure of a related device is increased, and the maintenance cost is increased. Therefore, in the present application, when the actual flow rate per unit time is different from the theoretical flow rate per unit time, the flow rate compensation value per unit time may be calculated according to the two, then the second parameter adjustment amount is calculated on the basis of the flow rate compensation value per unit time, and the heat sink is controlled by means of the second parameter adjustment amount, which is equivalent to compensating the deviation of heat dissipation speed caused by the resistance difference of the heat dissipation channel, whereby the temperature control is more accurate and the stable operation of the server is further ensured.

Figure 2:
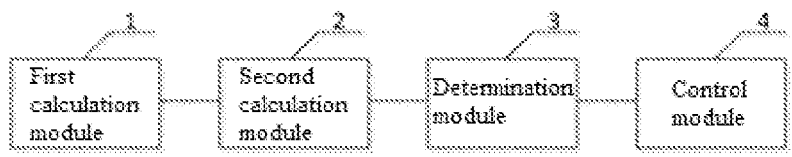
FIG. 2 is a structural schematic diagram of a heat dissipation control apparatus provided by the present disclosure.

Referring to FIG. 2. FIG. 2 is a structural schematic diagram of a heat dissipation control apparatus provided by the present disclosure. The heat dissipation control apparatus includes:

- a first calculation module 1, configured to calculate the heat generation speed of a heat dissipation channel according to a power consumption value of respective component in the heat dissipation channel;
- a second calculation module 2, configured to calculate the heat dissipation speed of the heat dissipation channel according to a temperature value of the heat dissipation channel and an actual flow rate of a heat dissipation medium per unit time;
- a determination module 3, configured to determine a first parameter adjustment amount for a heat sink according to the difference between the heat generation speed and the heat dissipation speed; and a control module 4, configured to control the heat sink according to the first parameter adjustment amount, whereby the heat dissipation speed matches the heat generation speed.

The introduction of the heat dissipation control apparatus provided by the embodiment of the present disclosure refers to the foregoing embodiment of the heat dissipation control method, and details are not descried herein again in the embodiment of the present disclosure.

Figure 3:
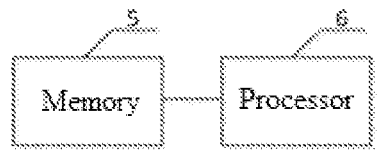
FIG. 3 is a structural schematic diagram of a heat dissipation control device provided by the present disclosure.

Refer to FIG. 3. FIG. 3 is a structural schematic diagram of a heat dissipation control device provided by the present disclosure. The heat dissipation control device includes: a memory 5, configured to store a computer program; and a processor 6, configured to implement the steps of the heat dissipation control method in the foregoing embodiment when executing the computer program.

The introduction of the heat dissipation control device provided by the embodiment of the present disclosure refers to the foregoing embodiment of the heat dissipation control method, and details are not descried herein again in the embodiment of the present disclosure.

All the embodiments in this specification are described in a progressive manner. Contents mainly described in each embodiment are different from those described in other embodiments. Same or similar parts of all the embodiments refer to each other. For the apparatus disclosed in the embodiments, since it corresponds to the method disclosed in the embodiments, the description is relatively simple, and the relevant part may be referred to the description of the method part. It should further be noted that the relation terms such as first and second in this specification are used only to distinguish one entity or operation from another entity or operation, and do not require or imply any actual relation or sequence between the entities or operations. Moreover, the terms "include", "comprise", and any variants thereof are intended to cover a non-exclusive inclusion, whereby a process, method, article, or device that includes a series of elements not only includes those elements, but also includes other elements not listed explicitly, or includes inherent elements of the process, method, article, or device. In the absence of more limitations, an element limited by "include a . . . " does not exclude other same elements existing in the process, method, article, or device including the element.

The foregoing descriptions of the disclosed embodiments enable those skilled in the art to implement or use the present disclosure. Various modifications to these embodiments are obvious to those skilled in the art, and the general principles defined herein may be implemented in other embodiments without departing from the spirit or scope of the present disclosure. Therefore, the present disclosure is not to be limited to these embodiments described herein, but conforms to the widest scope consistent with the principle and novelty disclosed herein.

What is claimed is:

1. A heat dissipation control method, comprising:
   calculating heat generation speed of a heat dissipation channel according to a power consumption value of each component in the heat dissipation channel;
   calculating heat dissipation speed of the heat dissipation channel according to a temperature value of the heat dissipation channel and an actual flow rate of a heat dissipation medium per unit time;
   determining a first parameter adjustment amount for a heat sink according to a difference between the heat generation speed and the heat dissipation speed; and
   controlling the heat sink according to the first parameter adjustment amount, whereby the heat dissipation speed is comparable to the heat generation speed.

2. The heat dissipation control method according to claim 1, wherein the step of calculating the heat generation speed of the heat dissipation channel according to the power consumption value of each component in the heat dissipation channel comprises:
   obtaining the power consumption value of each inactive component in the heat dissipation channel; and
   calculating the heat generation speed of the heat dissipation channel according to a sum of the power consumption values.

3. The heat dissipation control method according to claim 2, wherein the step of calculating the heat dissipation speed of the heat dissipation channel according to the temperature value of the heat dissipation channel and the actual flow rate of the heat dissipation medium per unit time comprises:

$$V_{heat\ dissipation} = C \times CFM \times \rho \times \Delta T;$$

$$CFM = V \times S;$$

where $V_{heat\ dissipation}$ is the heat dissipation speed, C is a specific heat capacity of air, CFM is the actual flow rate of the heat dissipation medium per unit time in the heat dissipation channel, $\rho$ is a density of the heat dissipation medium, $\Delta T$ is a temperature difference between an inlet temperature and an outlet temperature of the heat dissipation medium in the heat dissipation channel, V is a flow rate of the heat dissipation medium, and S is a cross-sectional area of the heat dissipation channel.

4. The heat dissipation control method according to claim 3, wherein a plurality of heat dissipation channels are provided;
   the step of obtaining the power consumption value of each inactive component in the heat dissipation channel comprises:

obtaining the power consumption value of each inactive component in a target heat dissipation channel; and the step of calculating the heat generation speed of the heat dissipation channel according to the sum of the power consumption values comprises:

calculating the heat generation speed of the target heat dissipation channel according to the sum of the power consumption values.

5. The heat dissipation control method according to claim 4, wherein the heat sink is a fan; and the heat dissipation channel is an air channel and the heat dissipation medium is air.

6. The heat dissipation control method according to claim 1, wherein the heat dissipation control method is applied to a processor independent of a server where the heat sink is located.

7. The heat dissipation control method according to claim 1, wherein a plurality of heat sinks correspond to the heat dissipation channel; and the step of controlling the heat sink according to the first parameter adjustment amount comprises:

controlling the plurality of heat sinks corresponding to the heat dissipation channel according to the first parameter adjustment amount, with a highest sum of energy conversion efficiencies of the plurality of heat sinks corresponding to the heat dissipation channel as a goal.

8. The heat dissipation control method according to claim 1, wherein after the step of controlling the heat sink according to the first parameter adjustment amount, the heat dissipation control method further comprises:

calculating a flow rate compensation value of the actual flow rate relative to a current theoretical flow rate in the heat sink per unit time;

generating a second parameter adjustment amount for the heat sink according to the flow rate compensation value per unit time; and controlling the heat sink according to the second parameter adjustment amount, whereby the actual flow rate per unit time is equal to the theoretical flow rate per unit time.

9. The heat dissipation control method according to claim 1, wherein the heat dissipation medium flows through the heat dissipation channel.

10. The heat dissipation control method according to claim 1, wherein the each component comprises a Central Processing Unit (CPU), a Graphics Processing Unit (GPU), and a wire.

11. The heat dissipation control method according to claim 1, wherein the step of controlling the heat sink according to the first parameter adjustment amount comprises:

adjusting an operating power consumption of the heat sink.

12. The heat dissipation control method according to claim 1, wherein the heat dissipation control method is performed every preset period of time.

13. A heat dissipation control device, comprising:

a memory, configured to store a computer program; and a processor, capable of executing the computer program, and upon execution of the computer program, configured to:

calculate heat generation speed of a heat dissipation channel according to a power consumption value of each component in the heat dissipation channel;

calculate heat dissipation speed of the heat dissipation channel according to a temperature value of the heat dissipation channel and an actual flow rate of a heat dissipation medium per unit time;

determine a first parameter adjustment amount for a heat sink according to a difference between the heat generation speed and the heat dissipation speed; and control the heat sink according to the first parameter adjustment amount, whereby the heat dissipation speed is comparable to the heat generation speed.

14. The heat dissipation control device according to claim 13, wherein the processor, upon execution of the computer program, is further configured to:

obtain the power consumption value of each inactive component in the heat dissipation channel; and calculate the heat generation speed of the heat dissipation channel according to a sum of the power consumption values.

15. The heat dissipation control device according to claim 14, wherein the step of calculating the heat dissipation speed of the heat dissipation channel according to the temperature value of the heat dissipation channel and the actual flow rate of the heat dissipation medium per unit time comprises:

$$V_{heat\ dissipation} = C \times CFM \times \rho \times \Delta T;$$

$$CFM = V \times S;$$

where $V_{heat\ dissipation}$ is the heat dissipation speed, C is a specific heat capacity of air, CFM is the actual flow rate of the heat dissipation medium per unit time in the heat dissipation channel, $\rho$ is a density of the heat dissipation medium, $\Delta T$ is a temperature difference between an inlet temperature and an outlet temperature of the heat dissipation medium in the heat dissipation channel, V is a flow rate of the heat dissipation medium, and S is a cross-sectional area of the heat dissipation channel.

16. The heat dissipation control device according to claim 15, wherein a plurality of heat dissipation channels are provided;

the processor, upon execution of the computer program, is further configured to:

obtain the power consumption value of each inactive component in a target heat dissipation channel; and calculate the heat generation speed of the target heat dissipation channel according to the sum of the power consumption values.

17. The heat dissipation control device according to claim 16, wherein the heat sink is a fan; and the heat dissipation channel is an air channel and the heat dissipation medium is air.

18. The heat dissipation control device according to claim 17, wherein the processor is independent of a server where the heat sink is located.

19. The heat dissipation control device according to claim 13, wherein a plurality of heat sinks correspond to the heat dissipation channel; and the processor, upon execution of the computer program, is further configured to:

control the plurality of heat sinks corresponding to the heat dissipation channel according to the first parameter adjustment amount, with a highest sum of energy conversion efficiencies of the plurality of heat sinks corresponding to the heat dissipation channel as a goal.

20. The heat dissipation control device according to claim 13, wherein the processor, upon execution of the computer program, is further configured to:

calculate a flow rate compensation value of the actual flow rate relative to a current theoretical flow rate in the heat sink per unit time;

generate a second parameter adjustment amount for the heat sink according to the flow rate compensation value per unit time; and control the heat sink according to the second parameter adjustment amount, whereby the actual flow rate per unit time is equal to the theoretical flow rate per unit time.

\* \* \* \* \*